United States Patent
Choi et al.

(10) Patent No.: US 10,935,991 B2
(45) Date of Patent: Mar. 2, 2021

(54) SYSTEM AND METHOD TO REFLECT RADAR USING AIRCRAFT

(71) Applicant: Aurora Flight Sciences Corporation, Manassas, VA (US)

(72) Inventors: Jae-Woo Choi, Manassas, VA (US); Boris Abramov, Manassas, VA (US); James D. Paduano, Boston, MA (US)

(73) Assignee: Aurora Flight Sciences Corporation, Manassas, VA (US)

(*) Notice: Subject to any disclaimer, the term of this patent is extended or adjusted under 35 U.S.C. 154(b) by 433 days.

(21) Appl. No.: 16/003,709

(22) Filed: Jun. 8, 2018

(65) Prior Publication Data
US 2021/0033716 A1    Feb. 4, 2021

(51) Int. Cl.
| | |
|---|---|
| *G05D 1/12* | (2006.01) |
| *G01S 17/02* | (2020.01) |
| *G01S 13/04* | (2006.01) |
| *B64C 39/02* | (2006.01) |
| *G05D 1/00* | (2006.01) |

(52) U.S. Cl.
CPC ............ *G05D 1/12* (2013.01); *B64C 39/024* (2013.01); *G01S 13/04* (2013.01); *G01S 17/02* (2013.01); *G05D 1/0011* (2013.01)

(58) Field of Classification Search
CPC ........ G05D 1/12; G05D 1/0011; G01S 13/04; G01S 17/02; B64C 39/024
See application file for complete search history.

(56) References Cited

U.S. PATENT DOCUMENTS

| | | | |
|---|---|---|---|
| 3,085,443 | A | 4/1963 | Manteuffel |
| 3,277,468 | A | 10/1966 | Caspers |
| 3,976,999 | A | 8/1976 | Moore et al. |
| 4,238,090 | A | 12/1980 | French |
| 4,267,562 | A | 5/1981 | Raimondi |
| 5,124,938 | A | 6/1992 | Algrain |
| 5,136,295 | A | 8/1992 | Bull et al. |
| 5,172,118 | A | 12/1992 | Peregrim et al. |
| 6,122,595 | A | 9/2000 | Varley et al. |
| 6,491,253 | B1 | 12/2002 | McIngvale |

(Continued)

FOREIGN PATENT DOCUMENTS

JP    S60 170777 A    9/1985

OTHER PUBLICATIONS

Extended European search report dated Nov. 13, 2019 in European Application No. 1917856.6.
A. J. Padgaonkar et al., "Measurement of Angular Acceleration of a Rigid Body Using Linear Accelerometers," J. Appl. Mech 42(3), 552-556 (Sep. 1, 1975).

(Continued)

*Primary Examiner* — Richard M Camby
(74) *Attorney, Agent, or Firm* — Michael Stanley Tomsa; McAndrews, Held & Malloy, Ltd.; Eugene H. Nahm

(57) ABSTRACT

The present disclosure is directed to scanning radar reflector systems, methods, and apparatuses; even more particularly to a system, method, and apparatus for scanning and reflecting a radar beam transmitted by a radar transmitter onboard an aerial vehicle with radar reflectors equipped on unmanned aerial vehicles. The radar reflection system may include one or more unmanned aerial vehicles equipped with a one or more axis gimbal upon which a radar reflector is mounted. A user may position the unmanned aerial vehicle and the radar reflector to target a specific region for radar scanning.

20 Claims, 6 Drawing Sheets

(56) References Cited

U.S. PATENT DOCUMENTS

| | | |
|---|---|---|
| 6,914,554 B1 | 7/2005 | Riley et al. |
| 6,960,750 B2 | 11/2005 | Doane |
| 8,049,870 B2 | 11/2011 | Mosier et al. |
| 8,825,436 B2 | 9/2014 | Zhang et al. |
| 9,562,773 B2 | 2/2017 | Paduano et al. |
| 9,568,919 B2 | 2/2017 | Lim |
| 9,758,239 B2 * | 9/2017 | Metzler .................. B64C 19/00 |
| 2015/0041598 A1 | 2/2015 | Nugent et al. |
| 2015/0274504 A1 | 10/2015 | Kitai et al. |
| 2015/0293225 A1 | 10/2015 | Riley et al. |
| 2016/0274222 A1 | 9/2016 | Yeun |
| 2018/0046187 A1 * | 2/2018 | Martirosyan .......... G05D 1/106 |
| 2018/0172833 A1 * | 6/2018 | Pyle ..................... G01S 17/003 |
| 2019/0063881 A1 * | 2/2019 | Abramov ............... G05D 1/104 |
| 2019/0068953 A1 * | 2/2019 | Choi ...................... G01B 11/25 |
| 2019/0250601 A1 * | 8/2019 | Donahoe ................ G05D 1/101 |

OTHER PUBLICATIONS

Marcelo C. Algrain, "Accelerometer-based platform stabilization", Proc. SPIE 1482, Acquisition, Tracking, and Pointing V, 367 (Aug. 1, 1991); doi:10.1117/12.45711.

Russell T. Rudin, "Strapdown Stabilization for Imaging Seekers," 2nd Annual AIAA SDIO Interceptor Technology Conference, Jun. 6-9, 1993 / Albuquerque, NM.

Barton J. Bacon et al., "Reconfigurable Flight Control Using Nonlinear Dynamic Inversion with a Special Accelerometer Implementation," American Institute of Aeronautics and Astronautics, Inc., AIAA-2000-4565, 2000.

Peter J. Kennedy, "Direct Versus Indirect Line of Sight (LOS) Stabilization," IEEE Transactions on Control Systems Technology, vol. 11, No. 1, Jan. 2003.

Stealth Micro Systems—Spectre RDD, Copyright 2001-2017, Stealth Micro Systems Pty Ltd., ABN 83 009 774 403, downloaded from ttp://www.spectre-rdd.com/spectre.asp on Sep. 12, 2017.

* cited by examiner

SYSTEM AND METHOD TO REFLECT RADAR USING AIRCRAFT

FIELD

The present disclosure relates to the field of aerial vehicle and aerial radar reflection systems, methods, and apparatuses; even more particularly to a system, method, and apparatus for scanning and reflecting a radar beam from a primary aircraft using a secondary aircraft.

BACKGROUND

Aircraft technology, including both manned and unmanned aerial vehicle ("UAV") technology, is a valuable tool for mission profiles involving intelligence, surveillance, reconnaissance, and payload delivery.

To circumvent enemy radars, manned and unmanned aerial vehicles often operate using nap-of-the-earth navigation, which refers to a very low-altitude flight course used by military aircraft to avoid enemy detection and attack in a high-threat environment. During nap-of-the-earth navigation, geographical features are used as cover by the aircraft. For example, the aircraft can exploit valleys and folds in the terrain by flying in them and not over them.

Currently, aerial vehicle pilots must reveal themselves by exiting nap-of-the-earth navigation in order to use radars and other sensors that may be required to launch weapons. Leaving the nap-of the earth, however, makes the aerial vehicles vulnerable to detection by enemy radar systems. This is particularly concerning when the aircraft is a manned aerial vehicle, i.e., where human life is also at risk.

Thus, a need exists for a system that enables a manned or unmanned aerial vehicle to use its radars and other sensors that are useful for radar tracking, without leaving the nap-of-the-earth navigation.

SUMMARY

The present disclosure is directed to scanning radar reflector systems, methods, and apparatuses; even more particularly to a system, method, and apparatus for scanning and reflecting a radar beam transmitted by a radar transmitter onboard an aerial vehicle (primary aircraft) with radar reflectors positioned on unmanned aerial vehicles (secondary aircraft). For example, the radar reflection system may include one or more unmanned aerial vehicles equipped with a one or more axis gimbal upon which a radar reflector is mounted. As will be discussed, a user may position the unmanned aerial vehicle and the radar reflector to target a specific region or object for radar scanning. By way of illustration and without limitation, the scanning radar reflector system may be deployed by a manned aerial vehicle flying using nap-of-the-earth navigation to achieve a radar lock-on of a target object without having to leave the nap-of-the-earth navigation.

According to a first aspect, an aerial system for locking-on to a target object in a target region comprises: a first aircraft equipped with a first radar system and a first communication system, wherein the primary radar system comprises a radar transmitter configured to output a radar beam; a second aircraft equipped with a second radar system and a second communication system, wherein the second radar system comprises a radar reflector configured to reflect a radar beam from the radar transmitter to the target region, wherein the second communication system is configured to communicate bi-directionally with the first communication system; and a user interface operatively coupled with the first communication system, wherein user interface is configured to receive inputs from a user to control an operation of the second aircraft to reflect the radar beam from the radar transmitter to the target object in the target region.

In certain aspects, the user interface enables the user to navigate the second aircraft to a desired location and position, wherein the desired location and position arranges the second aircraft in a manner to reflect the radar beam to the target object.

In certain aspects, the desired location and position is a higher altitude than the first aircraft.

In certain aspects, the radar reflector is coupled to the second aircraft via a gimbal.

In certain aspects, the second radar system is configured to modulate a frequency of the radar beam to achieve Doppler spoofing.

In certain aspects, the first aircraft is a manned aerial vehicle and the second aircraft is an unmanned aerial vehicle.

In certain aspects, the first aircraft is a helicopter.

In certain aspects, the first aircraft is a fixed wing aircraft.

In certain aspects, the user interface is positioned onboard the first aircraft.

In certain aspects, the first aircraft comprises a targeting system to receive location information of the target object from the radar transmitter to achieve a radar lock-on of the target object.

In certain aspects, the first aircraft further comprises a LIDAR transmitter to produce a LIDAR beam and the second aircraft comprises a LIDAR reflector to reflect the LIDAR beam from the LIDAR transmitter to the target region.

According to a second aspect, an unmanned aerial vehicle (UAV) comprises: a communication system to communicate bi-directionally with a master aircraft via a transceiver, wherein the UAV is configured to receive control signals from the master aircraft; a processor configured to communicate bi-directionally with the transceiver; a gimbal mounted to the UAV, wherein the gimbal is configured to rotate about at least two axes; a gimbal controller configured to control movement of the gimbal in response to control signals from the processor; and a radar system having a radar reflector, wherein the radar reflector coupled to a second end of the two-axis gimbal, and wherein the radar reflector is configured to reflect a radar beam from a radar transmitter positioned on the master to a target region.

In certain aspects, the control signals from the master aircraft are configured to dictate a flight path for the UAV and a position of the gimbal.

In certain aspects, the radar system is configured to modulate a frequency of the radar beam to achieve Doppler spoofing.

In certain aspects, the master aircraft is a manned aerial vehicle.

In certain aspects, the master aircraft is associated with a user interface to control an operation of the UAV, wherein the control signals are generated based at least in part on inputs from a user at the user interface.

In certain aspects, the UAV further comprises a LIDAR reflector, wherein the LIDAR reflector is configured to reflect a LIDAR beam from a LIDAR transmitter of the master aircraft to the target region.

According to a third aspect, a method for targeting an object from a manned aerial vehicle using an unmanned aircraft comprises: deploying the unmanned aircraft to a higher altitude than the manned aerial vehicle, wherein the unmanned aircraft comprises a radar reflector coupled to the unmanned aerial vehicle via a gimbal; establishing a communication link between the manned aircraft and the unmanned aircraft; controlling a location of the unmanned aircraft and a position of the radar reflector coupled to the gimbal via a user interface and the communication link; and transmitting a radar beam from a radar transmitter coupled to the manned aerial vehicle to the radar reflector, wherein the radar reflector is configured to reflect the radar beam.

In certain aspects, the method further comprises: deploying a second unmanned aircraft to a higher altitude than the manned aerial vehicle, wherein the second unmanned aircraft comprises a second radar reflector coupled to the second unmanned aircraft via a second gimbal, wherein the second unmanned aircraft is deployed to a different location from the first unmanned aircraft; establishing a second communication link between the manned aircraft and the second unmanned aircraft; controlling a location of the second unmanned aircraft and a position of the second radar reflector coupled to the second gimbal via the user interface and the second communication link; and transmitting a second radar beam from the radar transmitter coupled to the manned aerial vehicle to the second radar reflector, wherein the second radar reflector is configured to reflect the second radar beam.

In certain aspects, the radar reflector is configured to reflect the radar beam to a first target region selected via the user interface and the second radar reflector is configured to reflect the second radar beam to a second target region selected via the user interface.

In certain aspects, the method further comprises the step of determining whether a third party has detected the radar beam transmitted from the radar transmitter.

In certain aspects, the method further comprises the step of modulating the radar beam.

In certain aspects, the method further comprises the steps of: receiving a reflected radar beam from a scanned region back at the radar transmitter; and determining the location of a target object using the reflected radar beam.

In certain aspects, the method further comprises acquiring a radar lock-on of the target object.

DESCRIPTION OF THE DRAWINGS

The foregoing and other objects, features, and advantages of the devices, systems, and methods described herein will be apparent from the following description of particular embodiments thereof, as illustrated in the accompanying figures, where like reference numbers refer to like structures. The figures are not necessarily to scale, emphasis instead is being placed upon illustrating the principles of the devices, systems, and methods described herein.

DESCRIPTION

Figure 1:
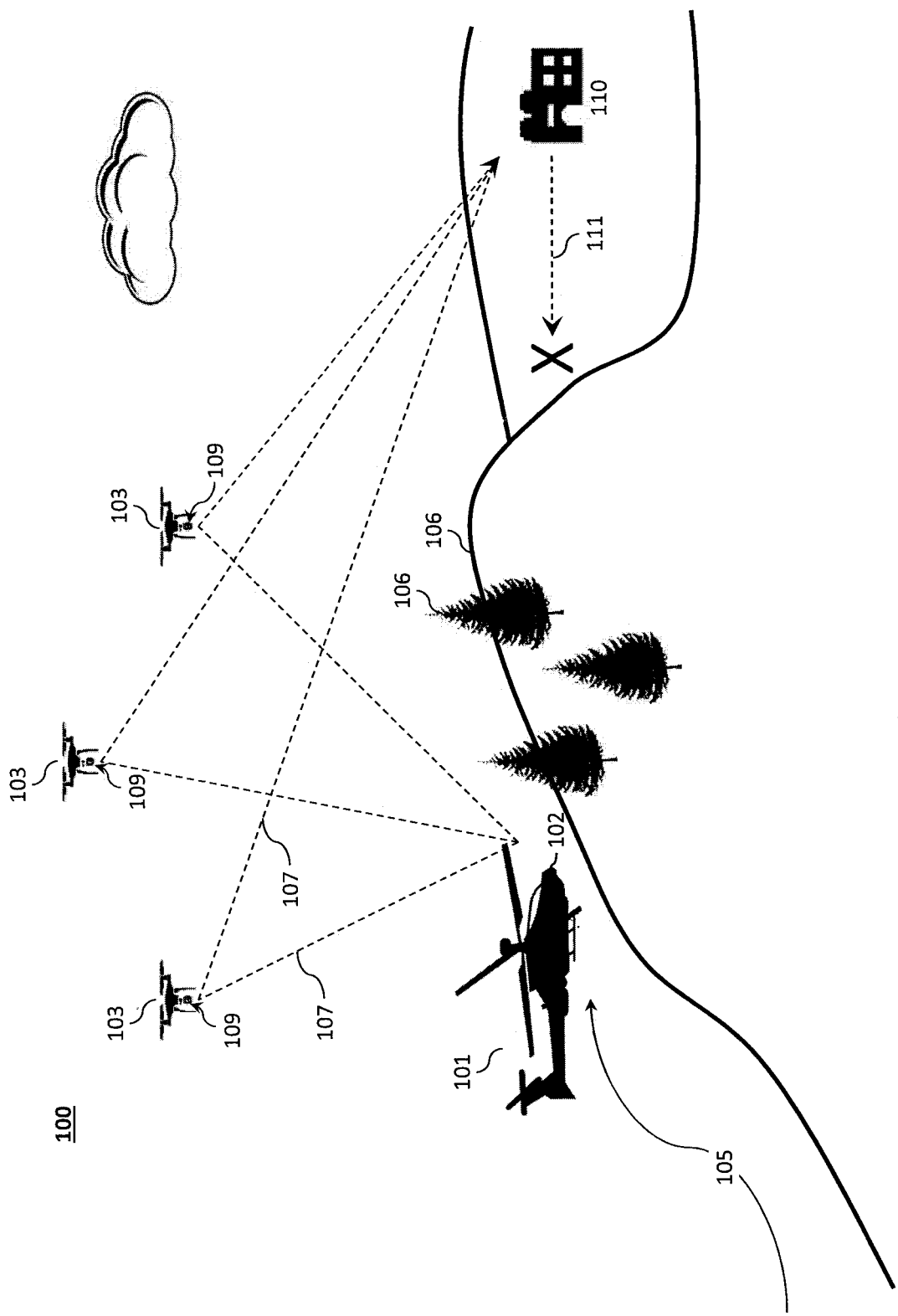
FIG. 1 illustrates an example radar reflection system deployed in an environment with a manned aerial vehicle as the primary aircraft.

Preferred embodiments of the present disclosure will be described hereinbelow with reference to the accompanying drawings. The components in the drawings are not necessarily drawn to scale, the emphasis instead being placed upon clearly illustrating the principles of the present embodiments. For instance, the size of an element may be exaggerated for clarity and convenience of description. Moreover, wherever possible, the same reference numbers are used throughout the drawings to refer to the same or like elements of an embodiment. In the following description, well-known functions or constructions are not described in detail because they may obscure the disclosure in unnecessary detail. No language in the specification should be construed as indicating any unclaimed element as essential to the practice of the embodiments.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "side," "front,", "frontal", "back," and the like, are words of convenience and are not to be construed as limiting terms. The various data values (e.g., voltages, seconds, etc.) provided herein may be substituted with one or more other predetermined data values and, therefore, should not be viewed limiting, but rather, exemplary. For this disclosure, the following terms and definitions shall apply.

The terms "about" and "approximately," when used to modify or describe a value (or range of values), mean reasonably close to that value or range of values. Thus, the embodiments described herein are not limited to only the recited values and ranges of values, but rather should include reasonably workable deviations.

The terms "aerial vehicle" and "aircraft" are used interchangeably and refer to a machine capable of flight, including, but not limited to, both traditional runway and vertical takeoff and landing ("VTOL") aircraft, and also including both manned and unmanned aerial vehicles ("UAV"). VTOL aircraft may include fixed-wing aircraft (e.g., Harrier jets), rotorcraft (e.g., helicopters), and/or tilt-rotor/tilt-wing aircraft.

The term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

The terms "communicate" and "communicating" refer to (1) transmitting, or otherwise conveying, data from a source to a destination, and/or (2) delivering data to a communications medium, system, channel, network, device, wire, cable, fiber, circuit, and/or link to be conveyed to a destination.

As utilized herein, circuitry or a device is "operable" to perform a function whenever the circuitry or device comprises the necessary hardware and code (if any is necessary) to perform the function, regardless of whether performance of the function is disabled, or not enabled (e.g., by a user-configurable setting, factory trim, etc.).

The term "exemplary" means serving as a non-limiting example, instance, or illustration. The terms "e.g.," and "for example" set off lists of one or more non-limiting examples, instances, or illustrations.

The term "processor" means processing devices, apparatuses, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, or integrated with a memory device.

RAdio Detection And Ranging (radar) uses radio waves to determine the range, angle, and/or velocity of a target object within a target region. Example target objects may include, inter alia, aircraft, ships, spacecraft, guided missiles, motor vehicles, weather formations, ground structures, and terrain. A radar system generally comprises a transmitter to produce a radar beam, one or more antenna, a receiver, and a processor to determine the properties of the target object(s). The radar beam is generally composed of electromagnetic waves (e.g., radio or microwaves domain, such as pulsed or continuous radio-frequency (RF) energy). In certain aspects, a single antenna may be used for both transmitting and receiving the radar beam.

In operation, the radar beam is transmitted by the transmitter to a target region and is reflected from objects, such as a target object. In other words, a small portion of the radar beam from the transmitter reflects off the target object and returns to the receiver (also known as returned energy or a return radar beam), thereby providing information about the target object's range, angle, and/or velocity. This returned energy is also sometimes called an echo. One way to obtain a distance measurement, for example, is based on the time-of-flight where the radar transmitter transmits the radar beam as a short pulse of radio signal (electromagnetic radiation) and measure the time it takes for the reflection to return. Another form of distance measuring radar is based on frequency modulation. For example, by measuring the frequency of the returned signal and comparing that with the original signal, the difference can be easily measured. A radar system may further employ Pulse-Doppler signal processing, which is a radar performance enhancement strategy that allows small high-speed objects to be detected in close proximity to large slow moving objects.

The radar system may be configured to automatically follow in real-time or near real-time (e.g., "track") a selected target object—a process generally known as radar lock-on. Example techniques for radar lock-on of an object can be achieved based on, for example, amplitude modulated information in the radar return signal; however, other methods for achieving radar lock-on of an object are also known in the art and are contemplated. Other systems similar to radar make use of other parts of the electromagnetic spectrum. One example is Light Detection And Ranging (LIDAR), which uses a LIDAR beam having predominantly infrared light from lasers rather than radio waves.

As can be appreciated, there are limits to the reach of radar (and LIDAR) beams. For example, a radar beam typically requires a generally unobstructed, straight, line of sight. The radar beam can be obstructed (e.g., by weather or shadowing) and/or subject to interference from other aircraft or from reflections from ground objects, thereby reducing usability. The radar horizon refers to the distance at which the radar beam rises enough above the Earth's surface to make detection of a target object at low level impossible. The radar horizon is associated with the low elevation region of performance, and its geometry depends on terrain, radar height, and signal processing. The radar horizon is associated with the notions of radar shadow, the clutter zone, and the clear zone.

Aircraft can exploit the radar shadow zone and clutter zone to avoid radar detection by using a flight technique called nap-of-the-earth navigation or nap-of-the-earth flight. While nap-of-the-earth navigation enables the aircraft to mitigate detection by third-party radar, nap-of-the-earth navigation complicates the aircraft's ability to use its own radar while performing nap-of-the-earth navigation. Therefore, a concern of radar systems is that an aircraft must typically reveal itself by exiting nap-of-the-earth navigation in order to use its radar and other sensors, which can be required (or otherwise useful) when launching weapons, for example.

Another concern with radar systems is that a third party may use a detected radar beam to determine the direction of the radar transmitter that is generating the detected radar beam. For example, a third party (e.g., an enemy aircraft) may employ a listener device to detect the radar beams transmitted from an aircraft to determine the location of the aircraft. This technique is sometimes called radio direction finding. To mitigate radio direction finding efforts, an aircraft may employ electronic countermeasures to spoof radar, such as radar jamming and deception.

Radar jamming and deception emit radio frequency signals to interfere with the operation of a radar by saturating its receiver with noise or false information. Two types of radar jamming including mechanical and electronic jamming. Mechanical jamming can be accomplished using by devices (e.g., chaff, corner reflectors, and decoys) that reflect or re-reflect radar energy back to the radar to produce false target returns on the operator's scope. Electronic jamming can be accomplished by radiating interfering signals toward an enemy's radar, thereby blocking the receiver with highly concentrated energy signals. Electronic jamming may employ, for example, noise techniques (e.g., spot, sweep, and barrage) and repeater techniques.

Despite the various advancements, a need exists for a radar system that enables an aircraft to use its radar or LIDAR, as the case may be, without leaving the nap-of-the-earth navigation, while also providing the ability to spoof radar frequencies to camouflage the location and speed of the aircraft. To address this need, disclosed herein is an advanced system that decreases the risks associated with navigation and launching projectiles while flying using nap-of-the-earth navigation. More specifically, a radar reflection system that enables a primary aircraft (e.g., a manned aerial vehicle) to use, for example, radar devices and other sensors useful in tracking and/or projectile delivery without requiring that the primary aircraft exit the nap-of-the-earth navigation. Specifically, the radar reflection system provides hardware and software architecture to a primary aircraft that employ a novel approach of radar reflection and scanning via a secondary aircraft (e.g., smaller, low cost, unmanned aerial vehicles). For example, the radar reflection system may employ one or more radar beam reflectors coupled to one or more secondary aircraft to reflect radar beams transmitted from primary aircraft operating at the nap-of-the-earth navigation.

As will be explained, the radar reflection system may be embodied with virtually any aircraft, whether a primary aircraft or secondary aircraft, including those configured with a human pilot, an autopilot, remote pilot, and/or another automated flight control system. Additionally, the radar frequency from the primary aircraft can be spoofed by the secondary aircraft to deter tracking by third parties. For example, if a ground operator has detected the radar beams, the secondary aircraft may camouflage the true location and speed of the primary aircraft.

FIG. 1 illustrates an example radar reflection system 100 configured to target a target object 110 in an outdoor environment. The reflection system 100 generally comprises a primary aircraft 101 (e.g., a manned aerial vehicle, such as the illustrated helicopter, fixed wing aircraft, etc.) and one or more secondary aircraft 103 (e.g., unmanned multirotor aircraft, such as the illustrated multirotor VTOL aircraft). The primary aircraft 101 may be equipped with a primary radar system 102 configured to acquire radar lock-on to the target object 110. The primary aircraft 101 may be further configured to interface for communication and control of one or more secondary aircraft 103.

In the illustrated nap-of-the-earth navigation path 105, the target object 110 is positioned behind obstacles 106 (e.g., manmade structures, such as buildings, and geographic features, such as trees, mountains, valleys, etc.) that block the line of sight path 111 between the primary aircraft 101 (e.g., its primary radar system 102) and the target object 110. Therefore, the obstacles 106 prevent an enemy at the target object 110 from detecting the primary aircraft 101 with its primary radar system 102; however, the obstacles 106 also prevent the primary radar system 102 equipped on the primary aircraft 101 from detecting and locking onto the target object 110.

To circumvent the obstacles 106, the radar reflection system 100 may employ a distributed radar hardware and software architecture that separates the scanning mechanism from the radar electronics to redirect a radar beam 107 from the primary aircraft 101 (e.g., the primary radar system 102) to the target object 110 via one or more secondary aircraft 103. The radar reflection system 100 effectively decouples the radar transmitter from the radar reflector—an arrangement that enables a primary aircraft 101 to target a target object 110 via a secondary aircraft 103 while the primary aircraft 101 remains in a nap-of-the-earth navigation.

As illustrated, the secondary aircraft 103 fly at a higher altitude (outside the nap-of-the-earth) than the primary aircraft 101 to, in effect, operate as a companion to a primary aircraft 101, thereby enabling greater mission capabilities. In this arrangement, the primary aircraft functions as a master controlling operation of the various secondary aircraft, each of which functions as a slave (e.g., a master-slave arrangement). The primary aircraft 101 or aerial vehicle can thus be referred to as a "master aircraft." For example, one or more secondary aircraft 103 may be deployed above a nap-of-the-earth flight path 105 to function as a radar relay for the primary aircraft 101. In other words, the primary aircraft 101 uses the one or more secondary aircraft 103 as radar relays such that the primary aircraft 101 can maintain a flight path 105 that is nap-of-the-earth.

By way of illustration, each of the secondary aircraft 103 can be equipped with a UAV payload 109 having, inter alia, a secondary radar system 104 and a communication system 108. The UAV payload 109 interfaces with other aircraft systems of the secondary aircraft 103 to allow an operator (e.g., a pilot, co-pilot, or another crewmember) associated with the primary aircraft 101 to detect and control the overall operation of the secondary aircraft 103. Each secondary radar system 104 is positioned on a secondary aircraft 103, while the radar transmitter 203 (e.g., part of a primary radar system 102) is positioned on the primary aircraft 101, which is typically operated by a human operator. Accordingly, each of the radar beam reflectors and the primary radar transmitter is decoupled from one another and is aerially mobile.

The secondary radar system 104 of the secondary aircraft 103 may be further equipped with a transmitter that can be used by the primary aircraft 101 to locate the secondary aircraft 103. The secondary radar system 104 can be scanned by a radar transmitter that is located on the primary aircraft 101 (e.g., part of the primary radar system 102). The secondary radar system 104 may then reflect the radar beam 107 transmitted from the primary radar system 102 toward a target region to identify a target object 110. For example, the operator, from the primary aircraft 101, may control the location/heading of the secondary aircraft 103, as well as remotely operate the secondary radar system 104. In operation, the primary aircraft 101 may locate and bi-directionally communicate with the one or more secondary aircraft 103 to effectively manipulate and direct the radar beam 107 from the primary aircraft 101 into the specified direction (e.g., toward the target object 110) via one or more radar beam reflectors (e.g., part of the secondary radar system 104, as will be described with regard to FIG. 2).

Using the one or more secondary aircraft 103, the primary aircraft 101 may thus acquire a radar lock-on of the target object 110, without exposing itself by leaving the nap-of-the-earth navigation path 105. In other words, a secondary aircraft 103 can be launched and fly at a higher altitude that is beyond the nap-of-the-earth in lieu of the primary aircraft 101 to allow the primary aircraft 101 to launch weapons without revealing itself during nap-of-earth flying.

The adjustable radar beam reflectors may be configured to scan on the secondary aircraft 103, which allows for radar lock-on of a target object 110 to be obtained while the primary aircraft 101 is positioned behind obstacles 106. For example, the secondary aircraft 103 operates to reflect and scan the radar beams 107 emitted from the primary aircraft 101 via the secondary radar system 104 to detect and lock onto the target object 110. The secondary aircraft 103 can also scan and reflect radar beams 107 from the primary aircraft 101 using one or more adjustable radar reflectors 233. Therefore, the secondary aircraft 103 facilitate air-to-air radar communications to redirect the radar beam 107 to a target object 110 that would not be possible with line-of-sight due to the primary aircraft 101 operating in nap-of-the-earth navigation.

The primary radar system 102 may include, for example, an active electronically scanned array, a passive electronically scanned array, metamaterial, electronically canned array radar, weather radar, or marine radar. To facilitate use with smaller primary aircraft 101, the radar sensor is preferably compact, lightweight, and low cost. The primary radar system 102 may employ, inter alia, Metamaterial Electronically Scanning Array (MESA) radar, and Lynx radar. By way of illustration, a primary radar system 102 on the primary aircraft 101 may be used to locate the secondary aircraft 103, which includes a secondary radar system 104 that can be scanned. To provide greater coverage, the primary radar system 102 (or portion thereof) may be configured to rotate using a mechanically rotating base structure. For example, a mechanically rotating base structure may couple with the primary radar system 102 via a drive shaft to provide a mechanically rotating radar system to scan the airspace in a radial pattern about the aircraft. Rotating the primary radar system 102 can provide full 360° coverage about the aerial vehicle and a predetermined azimuthal field of view such as, for example, a 15-40° azimuthal field of view. The primary radar system 102, or a portion thereof, may be continuously rotated at a predetermined rotational speed, such as 20 to 80 revolutions per minute (RPM), more preferably 40 to 60 RPM, most preferably 48 RPM (e.g., 0.8 Hz).

The primary radar system 102 may be housed in a dome or other structure to protect the radar equipment. The geometric shape of the dome may be aerodynamic to mitigate drag while traveling through the air. The dome is preferably manufactured from material transparent to radio waves and/or LIDAR light transmissions, and prevents contaminants (e.g., ice, freezing rain, dirt, debris, etc.) from accumulating directly on the radar equipment, such as the surface of radar antennas. In the case of a rotating/spinning radar dish antenna, the dome also protects the antenna from debris and rotational irregularities due to wind. The secondary radar system 104 may be chosen to focus the radar beam 107 from the primary aircraft 101 to a target object 110 at a specific distance away. For example, a target object that is 10 km away may be focused by a secondary radar system that is less than 1 km away from the primary aircraft.

The UAV payload 109, or portion thereof, may be coupled to or integrated with the secondary aircraft 103. For example, the UAV payload 109 (or a portion thereof, such as the secondary radar system 104) may be coupled to the secondary aircraft 103 via a gimbal (e.g., a two-axis gimbal), which allows for rotation of the radar reflectors; thereby enabling scanning capability to enable targeting specific regions.

To address radio direction finding, the radar reflection system 100 may additionally detect third-party listeners on the radar and spoof the radar frequencies with the secondary radar system 104. Typically, third party listeners can be detected by looking at the returned electromagnetic spectrum. Any significant absorption in the electromagnetic spectrum may be used to indicate a possibility of having a listener. This would be more apparent when the absorption is especially directional and/or bandwidth limited. In operation, the secondary radar system 104 modulates the radar beam 107 frequencies to provide Doppler frequency and chirping spoofing capabilities once a potential third-party listener is detected. This camouflages the true location and speed of the primary aircraft 101 from third-party listeners. Therefore, the radar reflection system 100 can be used to camouflage both the true location and speed of the primary aircraft 101 as a result of the ability of the secondary aircraft 103 to scan the radar reflector and radar frequencies. By way of illustration, the primary radar system 102 on the primary aircraft 101 can point towards the secondary aircraft 103. The secondary radar system 104 of the secondary aircraft 103 can employ a mechanism to detune the wavelength and reflect the radar beam 107 to the target object 110. The secondary radar system 104, via a gimbal, can then scan/direct the radar energy to locations of interest (e.g., target object 110) while the primary aircraft 101 remains nap-of-the-earth.

While illustrated as a helicopter, the primary aircraft 101 may also be another form of rotorcraft or a fixed wing aircraft, whether VTOL or not. The secondary aircraft 103 are preferably small enough such that multiple secondary aircraft 103 may be launched and coordinated from a single primary aircraft 101. In certain aspects, the secondary aircraft 103 may be housed within the primary aircraft 101 (e.g., within a payload bay) and deployed from the primary aircraft 101 when needed for radar relaying operations. Once the operation is complete, the secondary aircraft 103 may return to the primary aircraft 101 for stowage.

Figure 2:
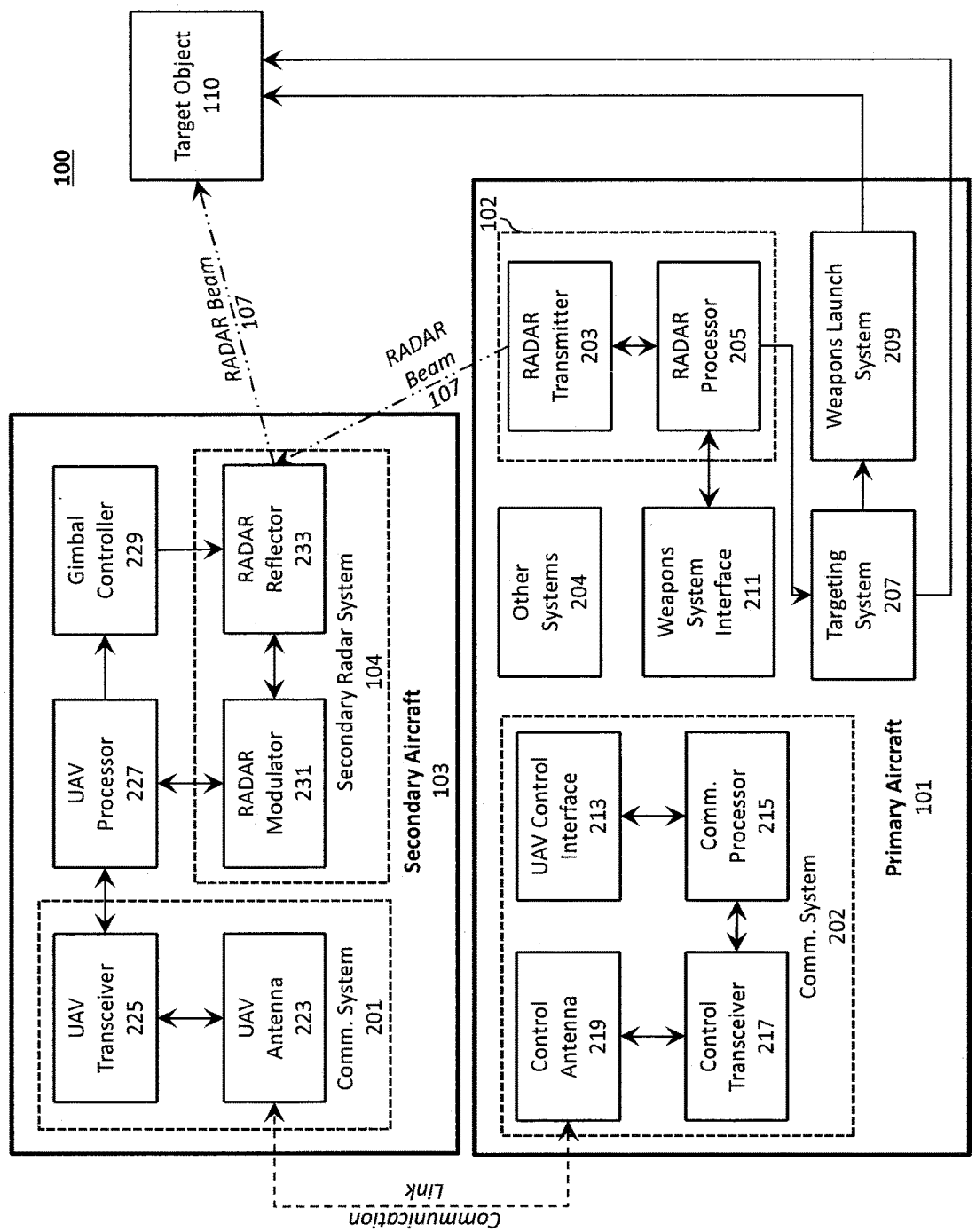
FIG. 2 illustrates a block diagram of an example of the radar reflection system.

FIG. 2 illustrates a block diagram of an example radar reflection system 100. An operator on the primary aircraft 101 may detect and control the location and heading of one or more secondary aircraft 103 (e.g., a UAV) using a UAV control interface 213, such as a graphical user interface provided via a tablet screen. The UAV control interface 213 may send control signals to a communications processor 215, which then sends signals electronically to the control transceiver 217. The control transceiver 217 then transmits the signals to the secondary aircraft 103 through the control antenna 219 (e.g., as controller commands). The secondary aircraft 103 may receive the control signals sent from the primary aircraft 101 through the UAV antenna 223 which is connected to the UAV transceiver 225. The UAV transceiver 225 may then forward the control signal to the UAV processor 227.

The secondary aircraft 103 may send its location, position, heading, and other information to an operator on the primary aircraft 101. The secondary aircraft 103 may contain a global positioning system (GPS) or another form of three dimensional location tracking system to track its own location. The UAV processor 227 may send its location, position, heading, and/or other information to the UAV transceiver 225, which then transmits the information via the UAV antenna 223. Preferably the communications between (i.e., bi-directional) the secondary aircraft 103 and primary aircraft 101 are private and protected. For example, the communication link may be encrypted using one or more civilian or military grade encryption standards, such as the military's Advanced Encryption Standard (AES)-256 encryption standard. The information transmitted from the UAV antenna 223 is then received by the control antenna 219 and sent to the control transceiver 217. The information is then processed by the communications processor 215, and can be viewed by the operator using the UAV control interface 213. By using the UAV communications system 202 as described above, an operator on the primary aircraft 101 may control the location, position, and heading of the secondary aircraft 103.

The primary aircraft 101 contains a primary radar system 102 having a radar transmitter 203 and a radar processor 205. The radar processor 205 may be operably connected to a targeting system 207, which may be operably connected to a launch system 209. An operator may control the primary radar system 102 and/or the weapons system via a weapons system interface 211. When the primary aircraft 101 performs nap-of-the-earth navigation, as noted above, obstacles 106 can be positioned between the primary aircraft 101 and the target object 110, thus the radar transmitter may not have a direct line of sight to the target object, and the target object 110 may then be obscured in the primary radar system 102. When the target object 110 is obscured, the targeting system 207 may not be able to lock-on to the target object 110.

To overcome this issue, an operator on the primary aircraft 101 may then deploy a secondary aircraft 103 (or multiple secondary aircraft 103), each equipped with a secondary radar system 104 having a radar reflector 233. The radar reflector 233 can be connected to a mechanical device that can move and position the radar reflector 233, such as a gimbal, which is coupled to the body (e.g., airframe) of the secondary aircraft 103. Preferably, the gimbal is at least a two-axis gimbal. The gimbal enables the radar reflector 233 to scan the radar beam 107 enabling the targeting of specific areas. The position of the gimbal may be controlled by a gimbal controller 229 via the UAV processor 227 in response to controller commands from an operator on the primary aircraft 101 by sending signals through the primary and secondary communications systems 201, 202.

The radar transmitter 203 may then send out a radar beam 107 that is scanned and reflected by the radar reflector 233 towards a target region. When the radar beam 107 is reflected towards the target region via the radar reflector 233, the target object 110 may be found by the primary radar system 102 aboard the primary aircraft 101. When the location of the target object 110 is received by the radar transmitter, the radar transmitter 203 may send the information to the radar processor 205. The radar processor 205 may then send the information to the targeting system 207. A radar lock-on of the target object 110 may then be achieved without the primary aircraft 101 leaving its nap-of-the-earth navigation. Projectiles may then be delivered to the target object 110 by the launch system 209 while the primary aircraft 101 is safely obscured from third-party radar in the nap-of-the-earth.

Additionally, the UAV processor 227 or the radar processor 205 may detect that ground operators or other third parties have detected the radar beams 107 transmitted by the radar transmitter 203. The radar beam 107 may be modulated by the radar reflector 233 and the radar modulator 331, which may enable Doppler and chirping spoofing when a third-party listener is detected. Doppler modulation can be enabled by mixing the radar signal with a frequency component that would correspond to an appropriate velocity; chirping may be modulated by changing the transmission properties across different frequencies on the radar reflector and modulator.

In certain aspects, in addition to or instead of a radar transmitter 203, the primary aircraft 101 and the secondary aircraft 103 may be equipped with other sensor systems 204, such as optical transmitters and/or receivers. For example, the secondary radar system 104 may be configured to scan and reflect LIDAR in addition to or instead of radar. LIDAR is a surveying method that measures distance to a target by illuminating that target with a pulsed laser light, and measuring the reflected pulses with a sensor. LIDAR is similar to radar, except that it is uses light waves instead of radio waves.

In another aspect, the optical transmitters and/or receivers may include a camera onboard the primary aircraft 101. For example, a user may position the secondary aircraft 103 and the reflector in such a way that light reflected by the reflector from a user selected region is scanned to the camera.

The reflector may be configured to reflect optical images or infrared radiation. Therefore, in some aspects, the camera may be an infrared camera. An advantage of infrared cameras is its thermal imaging functionality. To facilitate use with small aircraft, the infrared camera, like the radar transmitter 203, is preferably compact, lightweight, and low cost. While an infrared camera is described, other optical sensors may be similarly used in addition to, or in lieu of, the infrared camera, including, inter alia, ultraviolet, visible, near-infrared, short wave infrared, mid wave infrared, long wave infrared (LWIR), bolometer, electro-optical cameras, LED projection, structured light, multi-view reconstruction, etc.

Figure 3:
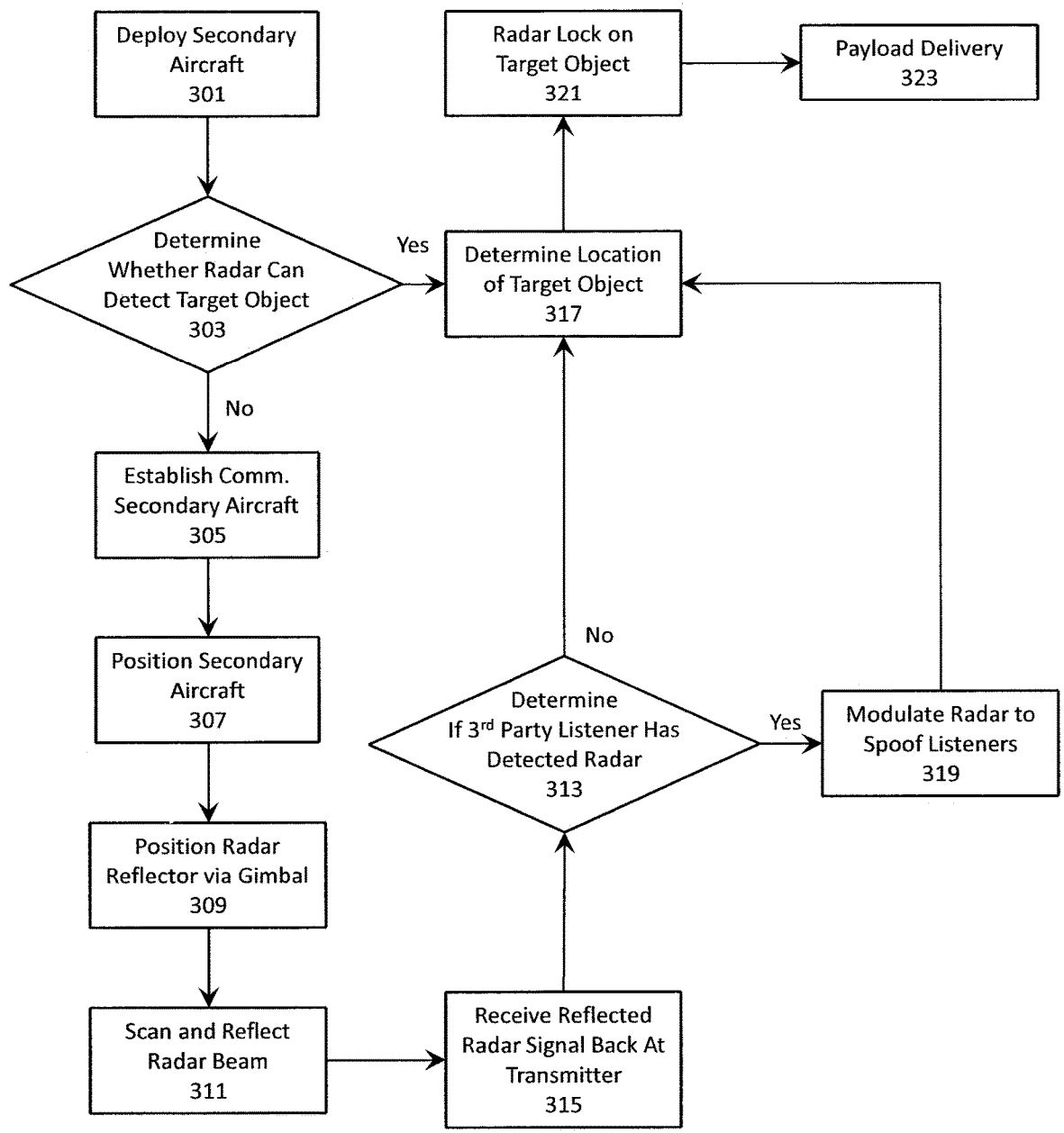
FIG. 3 illustrates a block diagram of an example of a method for operating the radar reflection system and controlling the secondary aircraft.

FIG. 3 illustrates a flow diagram 300 of an example method for achieving radar lock-on of a target object 110 while operating in a nap-of-the-earth navigation. While the method illustrated in FIG. 3 will be primarily used when the primary aircraft 101 is in a nap-of-the-earth navigation, it is contemplated that it could be used other times as well. At step 301, an operator or an automated system (e.g., the targeting system 207) may deploy the secondary aircraft 103 before attempting to target the target object 110. For example, the secondary aircraft 103 may be deployed from a payload bay (e.g., cargo area) of the primary aircraft 101 or a nearby base station, airport, or the like. Alternatively, the secondary aircraft 103 may accompany the primary aircraft 101 beginning at takeoff.

At step 303, the operator or the automated system may then determine whether the radar transmitter 203 aboard the primary aircraft 101 can detect the location of the target object 110. If the location of the target object 110 can be detected at step 303, then the targeting system 207 aboard the primary aircraft 101 may determine the location of the target object 110 at step 317. From step 317, the targeting system 207 may then achieve a radar lock-on of the target object 110 at step 321, and deliver the payload to the target object 110 at step 323.

If the radar cannot detect the target object 110 at step 303, for example, because geographic features between the primary aircraft 101 and the target object 110 block the radar beams 107, then the radar reflectors 233 aboard the secondary aircraft 103 may be used to detect the location of the target object 110. The primary aircraft 101 may then establish communications with the secondary aircraft 103 at step 305. The operator may have a graphical user interface to serve as the weapons system interface 211 and the UAV control interface 213, which may provide an application on an electronic tablet to allow the operator to communicate with and control the secondary aircraft 103 (and components/payloads thereof).

While it is contemplated that the operator is aboard the primary aircraft 101, it is also contemplated that the secondary aircraft 103 may be controlled by an operator from a different location, for example from the ground base from which the primary aircraft 101 was launched. It is also contemplated that the aerial vehicle that holds the radar transmitter 203 may be unmanned.

At step 307, the operator may direct the secondary aircraft 103 to a location with a view of both the primary aircraft 101 and the target object 110 (e.g., a higher altitude). At step 309, the operator may then control the positioning of the radar reflector 233 aboard the secondary aircraft 103 by adjusting the gimbal (via gimbal controller 229) to which the radar reflector 233 is mounted on the secondary aircraft 103. In one aspect of the disclosure, the gimbal can rotate about two axes, which enables radar scanning to enable the targeting of specific regions. This is noteworthy because the operator may know the region where the target object 110 is located, but may not know the exact location. Therefore, by adjusting the position of the gimbal, the operator may adjust the radar reflectors 233 to target a specific region for radar scanning in order to locate the target object 110. Once the gimbal is adjusted then, the radar reflector may reflect the radar beam 107 and regions may be scanned for the target object 110 at step 311. The radar transmitter aboard the primary aircraft 101 may then receive the reflected radar beam 107, which may be used to determine the target location at step 315.

Third-party listeners may be able to detect radar beams 107, and thereby learn the location of the transmitter aboard the primary aircraft 101. Therefore, the radar reflection system 100 may determine at step 313 whether any third-party listeners are attempting to detect or have detected the radar beams 107 being transmitted from the primary aircraft 101. If the radar reflection system 100 determines that third-party listeners have detected the radar beams 107, the radar reflectors may modulate the radar beam 107 frequencies using, for example, Doppler frequency spoofing at step 319; otherwise, the process continues to step 317. This spoofing capability camouflages the true location and speed of the primary aircraft 101, thereby protecting the safety of the primary aircraft 101 and its crew.

Once the transmitter has received the reflected signal back at step 315, a targeting signal may use the radar information to determine the location of the target object 110 at step 317. Once the location of the target object 110 is determined, the targeting system 207 may achieve a radar lock-on of the target object 110 at step 321. At step 323, once the radar lock is achieved, the payload may be delivered to the target object 110 via the launch system 209 accurately.

Figure 4A:
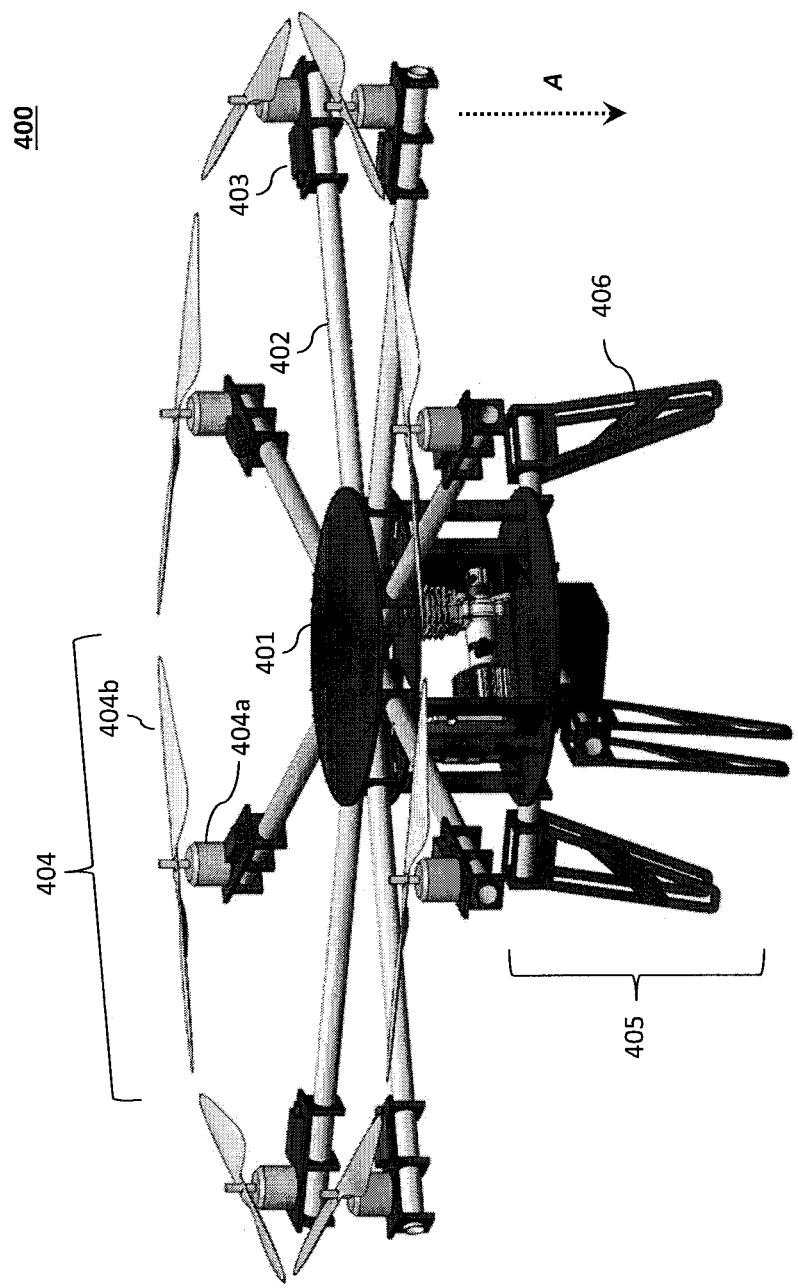
FIG. 4a illustrates an example secondary aircraft.

A suitable secondary aircraft 103 for use with the radar reflection system 100 includes the multi-rotor VTOL UAV 400 illustrated in FIG. 4a. As illustrated, the UAV 400 generally comprises an airframe 401 (e.g., a fuselage or other structure), a plurality of rotor booms 402 (e.g., longitudinal booms) extending radially from the airframe 401, landing gear 405, and a plurality of propulsors 404. The UAV 400 is capable of aerial motion in three dimensions, x, y, and z. While a multi-rotor VTOL UAV is illustrated throughout the figures, the teachings of the present disclosure may similarly be applied to other aircraft, including fixed-wing aircraft.

The airframe 401 may be coupled with a proximal end of each of the plurality of rotor booms 402 such that the distal ends of the plurality of rotor booms 402 extend radially from the airframe 401. The airframe 401 and the plurality of rotor booms 402 may be fabricated as a singular unit, or as separate components to be coupled to one another. The distal end of each of the plurality of rotor booms 402 may be coupled with a propulsor 404, each of which is illustrated as a lift motor 404a coupled to, and configured to drive/rotate, a propeller 404b. Each of said plurality of propulsors 404 can be placed at a distal end of a rotor boom 402 and oriented to direct thrust downward (direction A) to provide lift. The lift motor 404a may be an electric motor controlled via an electronic speed controller (ESC) 403. To that end, an ESC 403 may also be provided on (or integrated with) each rotor boom 402, for example, adjacent the lift motor 404a. The ESC 403 may be operatively coupled with the UAV processor 227, which operates as the flight control system. In certain aspects, the UAV 400 may employ a hybrid-electric propulsion system where a wet fuel engine drives one or more generators to provide power during operation. While the UAV 400 is illustrated as having eight propulsors 404 (i.e., an octo-rotor aircraft), a person of skill in the art would understand that additional, or fewer, propulsors 404 may be employed to achieve a desired function and depending on, for example, thrust requirements.

While the lift motors 404a are illustrated at the distal end of each rotor boom 402, the lift motors 404a (or a single lift motor 404a) may instead be positioned at the airframe 401 and configured to drive (rotate) the one or more propellers 404b via a gearbox and/or a driveshaft between the lift motor 404a and the one or more propellers 404b. Further, while each rotor boom 402 is illustrated as having only a single propulsor 404, multiple propulsors 404 may be provided at the distal end of each rotor boom 402. For example, a cross-member may be positioned at the distal end of each rotor boom 402 and arranged to space the propulsors 404 from one another (e.g., perpendicularly to the length of the rotor boom 402) or to otherwise prevent interference between propellers 404b (e.g., a staggered/overlapping configuration). The components of the UAV 400 may be fabricated from metal, a composite material, or a combination thereof. While the landing gear 405 is illustrated as a plurality of rigid struts 406 positioned along the perimeter of the airframe 401, the plurality of struts 406 may instead be positioned along the outer perimeter of the UAV 400 (e.g., at the distal end of each rotor boom 402) to increase ground stability via a larger ground foot-print.

To collect data and/or monitor an area, the UAV 400 may further be equipped with an intelligence, surveillance, and reconnaissance (ISR) payload comprising, for example, one or more cameras (e.g., an optical instrument for recording or capturing images and/or video, including LIDAR devices), audio devices (e.g., microphones, echolocation sensors, etc.), and other sensors to facilitated ISR functionality and provide ISR data (e.g. photographs, video, audio, sensor measurements, etc.). The ISR payload is operatively coupled to the aircraft processor to facilitate communication of the ISR data between the ISR payload and the aircraft processor. The ISR payload may be rotatably and pivotally coupled to, for example, the underside surface of the airframe 401 (or another structural component, such as the rotor booms 402) via a gimbal system to enable the ISR payload to be more easily oriented downward to monitor objects below and/or on the ground. The data may be dynamically or periodically communicated from the UAV 400 to the primary aircraft 101 or a remote device over the network via the primary and secondary communications systems 201, 202, or stored to the memory device for later access or processing.

Figure 4C:
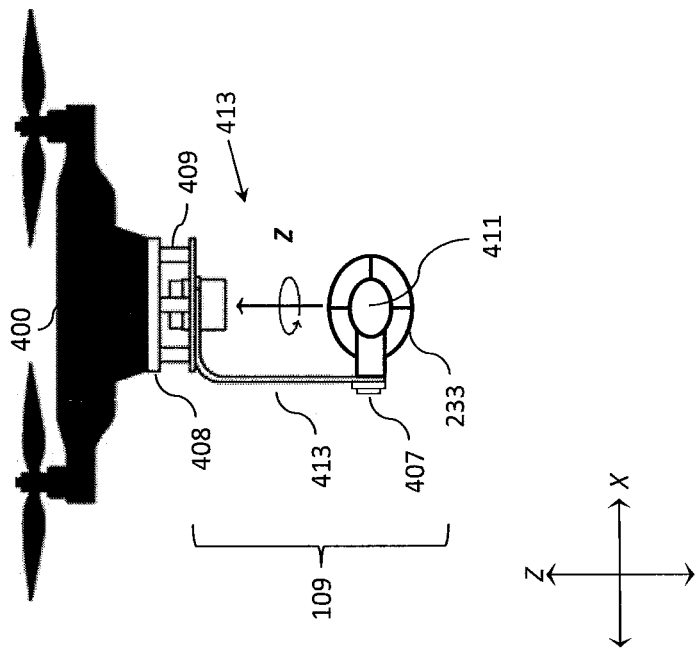
FIGS. 4b and 4c illustrate an example radar reflector coupled to a gimbal of a secondary aircraft.
Figure 4B:
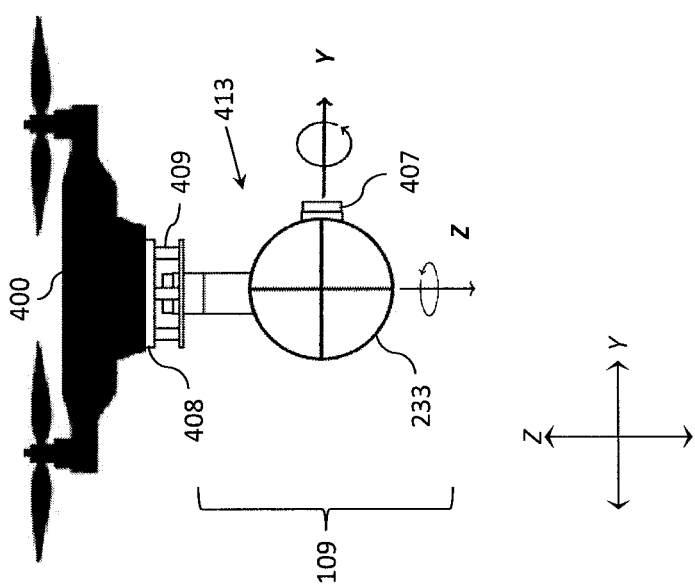

FIGS. 4b and 4c illustrate, respectively, front and side views of a UAV payload 109 attached to the UAV 400. A gimbal 413 is secured to the airframe 401 (e.g., at its underside) by a first mounting bracket 408. A radar reflector 233 (or another part of the UAV payload 109 or ISR payload) may be attached to the gimbal 413 by a second mounting bracket 411. In one aspect, the gimbal 413 is capable of rotation along two axes (e.g., the z and y axes). To that end, the gimbal 413 contains a first pivotal socket 409 that allows the radar reflector 233 to rotate about the z axis and a second pivotal socket 407 that allows the radar reflector 233 to rotate about the y axis. In other contemplated aspects, the gimbal 413 may be capable of motion along three axes (e.g., the x, y, and z axes). The gimbal 413 may be powered, for example with servo motors controlled by the gimbal controller 229, which allows an operator located on a primary aircraft 101 to adjust the position of the gimbal 413 and the radar reflector 233.

The gimbal 413 may also be equipped with gimbal stabilization technology, which operates to maintain a gimbal position or angle constant in the inertial frame while in the presence of aircraft motion disturbance. Aircraft motion disturbance may include, for example, a jitter (i.e., a slight irregular movement, variation, or other unsteadiness), turbulence, a gust of wind, a maneuver during flight, etc. Gimbal stabilization may be provided by a gimbal controller 229 through angular rate feed forward compensation. That is, say inertial measurement units/devices (e.g., gyroscopes and other devices) on the aircraft measure angular rate motion and transmit the angular rates to the gimbal controller 229, which controls movement of the gimbal 413 (or set of gimbals). Using the measurements, the gimbal controller 229 adjusts the motion of the gimbal 413 for a net rate of near zero in the inertial frame to maintain a steady line of sight for sensors on the gimbal 413. Particular gimbal applications in this case involve the stabilization of the secondary radar system 104. In which case, when the UAV 400 undergoes rotational motion about its axes, the line-of-sight remains fixed with respect to the inertial reference frame of the UAV 400.

Figure 5:
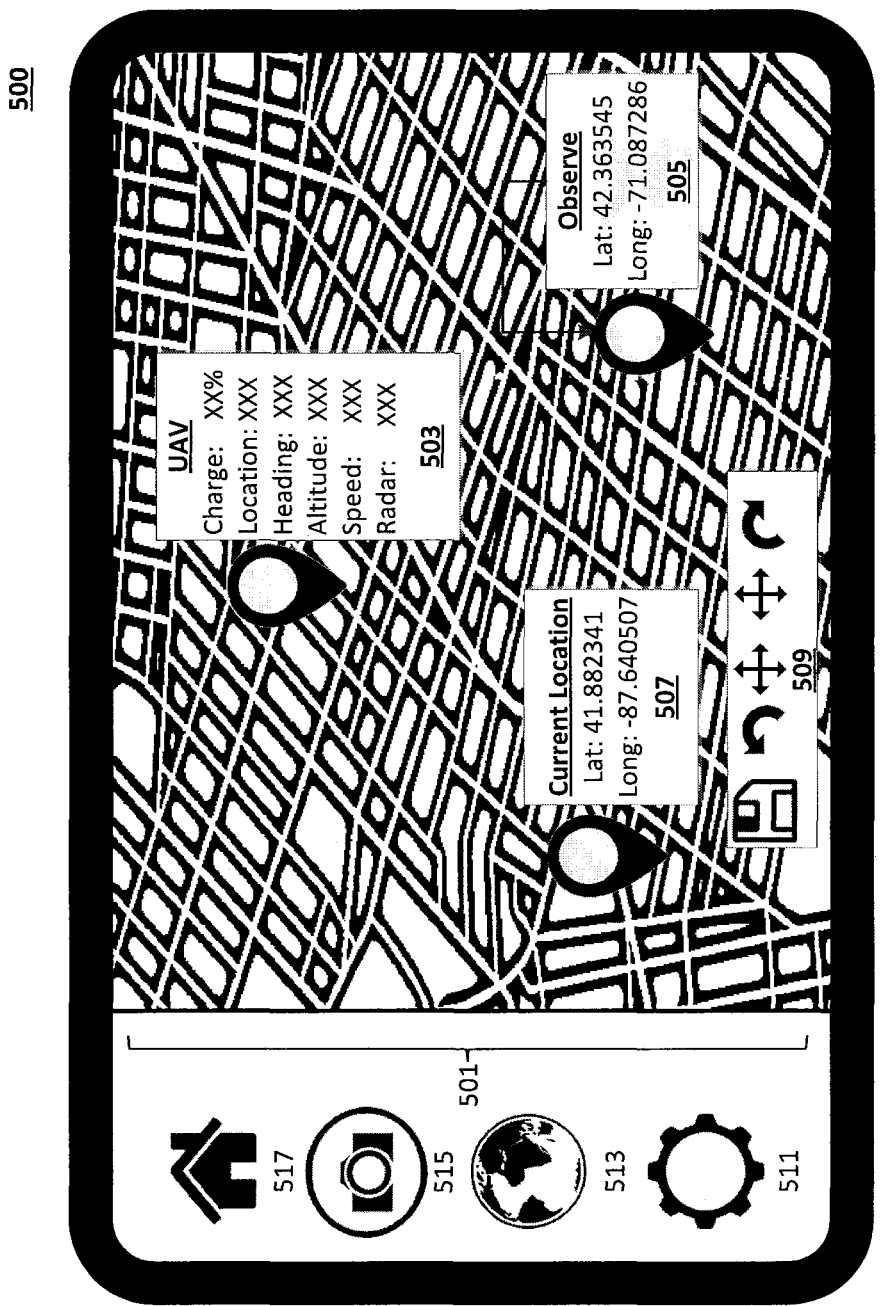
FIG. 5 illustrates an example of a graphical user interface an operator may use for controlling the radar reflection system.

FIG. 5 illustrates an example of a human-machine interface 500 configured to serve as the user/operator interface for an operator to use to communicate with (and control) the secondary aircraft 103. The human-machine interface 500 serves as a channel of communication between the operator and the secondary aircraft 103. The human-machine interface 500 may be equipped with a processor configured to communicate with the secondary aircraft 103 through the primary and secondary communications systems 201, 202. The human-machine interface 500 may be used to display location data, heading, power, altitude, speed, gimbal position, or other information. The human-machine interface 500 may be used to send control signals to the secondary aircraft 103. Multiple secondary aircraft 103 may be controlled using the human-machine interface 500.

The human-machine interface 500 may display on its display device (e.g., an LCD display) the position of a UAV 503 on a geographic map 501, and it may also display the position of the interface itself 507. The human-machine interface 500 may be equipped with a GPS or other location tracker so that it may track display own location. 507 The user may also select a location 505 for the secondary aircraft 103 to observe. The interface may have a control window 509 for sending control signals to the secondary aircraft 103. Control signals may include adjusting the gimbal position on the secondary aircraft 103, or navigating/positioning the secondary aircraft 103 at a desired location, or directing the secondary aircraft 103 to adjust its location. The human-machine interface 500 may also contain a control to exit the map 517. For example, the human-machine interface 500 may also have a controller to send a signal to the secondary aircraft 103 to capture an image with a camera mounted on the secondary aircraft 103 (e.g., the ISR payload) and to send the image to the human-machine interface 500. The human-machine interface 500 may also have a map control 513 to change the map type. The human-machine interface 500 may also have a control to change other settings 511. In certain aspects, the geographic map 501 may be saved, exported, rotated, or panned using a control window 509. The area map, for example, may be saved or exported as a static image or a data set (or database) representing the secondary aircraft location, speed, terrain, etc.

In certain aspects, the weapons system interface 211 and the secondary aircraft (e.g., UAV) control interface 213 may be provided through a single human-machine interface or as separate human-machine interfaces (e.g., hardware with software). To that end, one or more human-machine interfaces may be provided (e.g., at the primary aircraft 101 or on the ground) to communicate with and provide information to the operator regarding the current state of the secondary aircraft 103 and its secondary radar system 104. The human-machine interface includes software and/or hardware to convey inputs from and displays information to the operator. The human-machine interface may be based on a touch screen graphical user interface ("GUI") and/or speech-recognition system. The human-machine interface may employ, for example, a tablet computer, a laptop computer, a smart phone, head mounted display, or combination thereof. The human-machine interface 500 can be secured near the operator of the primary aircraft 101 or elsewhere, depending on operator preferences. For example, the human-machine interface 500 may be removable coupled to the cockpit or, in certain aspect, employ an integrated display within the cockpit (e.g., an existing display).

Although various embodiments have been described with reference to a particular arrangement of parts, features, and like, these are not intended to exhaust all possible arrangements or features, and indeed many other embodiments, modifications, and variations may be ascertainable to those of skill in the art. Thus, it is to be understood that the disclosure may therefore be practiced otherwise than as specifically described above.

What is claimed is:

1. An aerial system for locking-on to a target object in a target region, the aerial system comprising:
a first aircraft equipped with a first radar system and a first communication system,
wherein the first radar system comprises a radar transmitter configured to output a radar beam;
a second aircraft equipped with a second radar system and a second communication system,
wherein the second radar system comprises a radar reflector configured to reflect a radar beam from the radar transmitter to the target region, and
wherein the second communication system is configured to communicate bi-directionally with the first communication system; and
a user interface operatively coupled with the first communication system,
wherein user interface is configured to receive inputs from a user to control an operation of the second aircraft to reflect the radar beam from the radar transmitter to the target object in the target region.

2. The aerial system of claim 1, wherein the user interface enables the user to navigate the second aircraft to a desired location and position, wherein the desired location and position arranges the second aircraft in a manner to reflect the radar beam to the target object.

3. The aerial system of claim 2, wherein the desired location and position is a higher altitude than the first aircraft.

4. The aerial system of claim 1, wherein the radar reflector is coupled to the second aircraft via a gimbal.

5. The aerial system of claim 1, wherein the second radar system is configured to modulate a frequency of the radar beam to achieve Doppler spoofing.

6. The aerial system of claim 1, wherein the first aircraft is a manned aerial vehicle and the second aircraft is an unmanned aerial vehicle.

7. The aerial system of claim 1, wherein the user interface is positioned onboard the first aircraft.

8. The aerial system of claim 1, wherein the first aircraft comprises a targeting system to receive location information of the target object from the radar transmitter to achieve a radar lock-on of the target object.

9. The aerial system of claim 1, wherein the first aircraft further comprises a LIDAR transmitter to produce a LIDAR beam and the second aircraft comprises a LIDAR reflector to reflect the LIDAR beam from the LIDAR transmitter to the target region.

10. An unmanned aerial vehicle (UAV) comprising:
a communication system to communicate bi-directionally with a master aircraft via a transceiver, wherein the UAV is configured to receive control signals from the master aircraft;
a processor configured to communicate bi-directionally with the transceiver;
a gimbal mounted to the UAV, wherein the gimbal is configured to rotate about at least two axes;
a gimbal controller configured to control movement of the gimbal in response to control signals from the processor; and
a radar system having a radar reflector,
wherein the radar reflector coupled to a second end of the gimbal, and
wherein the radar reflector is configured to reflect a radar beam from a radar transmitter positioned on the master aircraft to a target region.

11. The UAV of claim 10, wherein the control signals from the master aircraft are configured to dictate a flight path for the UAV and a position of the gimbal.

12. The UAV of claim 10, wherein the radar system is configured to modulate a frequency of the radar beam to achieve Doppler spoofing.

13. The UAV of claim 10, wherein the master aircraft is associated with a user interface to control an operation of the UAV, wherein the control signals are generated based at least in part on inputs from a user at the user interface.

14. The UAV of claim 10, further comprising a LIDAR reflector, wherein the LIDAR reflector is configured to reflect a LIDAR beam from a LIDAR transmitter of the master aircraft to the target region.

15. A method for targeting an object from a manned aerial vehicle using an unmanned aircraft, the method comprising:
deploying the unmanned aircraft to a higher altitude than the manned aerial vehicle,
wherein the unmanned aircraft comprises a radar reflector coupled to the unmanned aircraft via a gimbal;
establishing a communication link between the manned aerial vehicle and the unmanned aircraft;
controlling a location of the unmanned aircraft and a position of the radar reflector coupled to the gimbal via a user interface and the communication link; and
transmitting a radar beam from a radar transmitter coupled to the manned aerial vehicle to the radar reflector, wherein the radar reflector is configured to reflect the radar beam.

16. The method of claim 15, further comprising:
deploying a second unmanned aircraft to a higher altitude than the manned aerial vehicle,
wherein the second unmanned aircraft comprises a second radar reflector coupled to the second unmanned aircraft via a second gimbal, and
wherein the second unmanned aircraft is deployed to a different location from the first-mentioned unmanned aircraft;
establishing a second communication link between the manned aerial vehicle and the second unmanned aircraft;
controlling a location of the second unmanned aircraft and a position of the second radar reflector coupled to the second gimbal via the user interface and the second communication link; and
transmitting a second radar beam from the radar transmitter coupled to the manned aerial vehicle to the second radar reflector,
wherein the second radar reflector is configured to reflect the second radar beam.

17. The method of claim 16, wherein the radar reflector is configured to reflect the radar beam to a first target region selected via the user interface and the second radar reflector is configured to reflect the second radar beam to a second target region selected via the user interface.

18. The method of claim 15, further comprising the step of determining whether a third party has detected the radar beam transmitted from the radar transmitter.

19. The method of claim 18, further comprising the step of modulating the radar beam.

20. The method of claim 15, further comprising the steps of:
receiving a reflected radar beam from a scanned region back at the radar transmitter; and
determining the location of a target object using the reflected radar beam.

* * * * *